(12) United States Patent
Lothar

(10) Patent No.: US 7,267,142 B2
(45) Date of Patent: Sep. 11, 2007

(54) METHOD FOR INCREASING THE TORQUE OF A PRE-TENSIONED SPRING THAT IS WOUND AROUND A ROTATING BODY COMPRISING A LONGITUDINAL AXIS

(75) Inventor: Schroeder Lothar, Karben (DE)

(73) Assignee: Siemens AG, München (DE)

( * ) Notice: Subject to any disclaimer, the term of this patent is extended or adjusted under 35 U.S.C. 154(b) by 204 days.

(21) Appl. No.: 10/546,259

(22) PCT Filed: Oct. 7, 2004

(86) PCT No.: PCT/EP2004/052473

§ 371 (c)(1),
(2), (4) Date: Aug. 22, 2005

(87) PCT Pub. No.: WO2005/042972

PCT Pub. Date: May 12, 2005

(65) Prior Publication Data
US 2006/0237886 A1    Oct. 26, 2006

(30) Foreign Application Priority Data
Oct. 31, 2003  (DE) ................................. 103 50 888

(51) Int. Cl.
*B21F 35/00* (2006.01)
(52) U.S. Cl. ......................... 140/89; 140/124; 267/277
(58) Field of Classification Search .................. 140/89, 140/3 CA, 103, 124; 192/56.2, 84.81, 89.27; 267/275, 277
See application file for complete search history.

(56) References Cited

U.S. PATENT DOCUMENTS

| 2,418,110 A | 4/1947 | Burkhardt |
| 2,679,167 A | 5/1954 | Nichinson |
| 2,722,846 A * | 11/1955 | McDonald .................. 74/355 |
| 2,934,970 A | 5/1960 | Parstorfer |
| 3,721,086 A * | 3/1973 | Flumm ...................... 368/222 |
| 3,729,077 A | 4/1973 | Torgai |

(Continued)

FOREIGN PATENT DOCUMENTS

DE    763 703    7/1953

(Continued)

OTHER PUBLICATIONS

Derwent Abstract—DE-101 36 155 A1; Apr. 4, 2002; Levon Grigorjan, D-49565 Bramsche, Germany.

(Continued)

*Primary Examiner*—Ed Tolan

(57) ABSTRACT

The present invention relates to a method wherein a first end and a second end of a pre-tensioned spring are positioned against a first and second stop. A rotating body is first rotated about its longitudinal axis such that the first end engages once in a cam wheel during each rotation, the wheel having at least X+1 teeth and at least one cam that runs parallel with the teeth. The cam wheel thus rotates one tooth further with each rotation of the rotating body. The rotating body is subsequently subjected to pre-tensioning until the cam wheel and its cam lies against a third stop and the first end engages the cam wheel. The rotation is then continued in order to increase the torque.

8 Claims, 5 Drawing Sheets

U.S. PATENT DOCUMENTS

| | | | | |
|---|---|---|---|---|
| 4,129,049 A | * | 12/1978 | Perard | 74/625 |
| 4,257,500 A | * | 3/1981 | Brunner | 192/35 |
| 4,836,514 A | * | 6/1989 | Ulbing | 267/166 |
| 5,040,651 A | | 8/1991 | Hampton et al. | |
| 5,234,088 A | | 8/1993 | Hampton | |
| 5,899,399 A | * | 5/1999 | Brown et al. | 242/374 |

FOREIGN PATENT DOCUMENTS

| | | |
|---|---|---|
| DE | 916 740 | 1/1954 |
| DE | 101 36 155 A1 | 4/2002 |
| FR | 2 454 128 A1 | 11/1980 |
| JP | 07042511 A | 2/1995 |
| WO | WO 03/087611 A1 | 10/2003 |

OTHER PUBLICATIONS

Derwent Abstract—FR-2 454 128 A1; Nov. 7, 1980; Nauchno-Issedovatelsky Institut Chasovoi Promyshlennosti, UDSSR.

Abstract—DE-916 740; Jan. 7, 1954; Peltzer & Ehlers, Krefeld, Germany.

Abstract—DE-76 703; Jul. 27, 1953; Siemens-Schuckertwerke A.G., Berlin und Erlangen, Germany.

* cited by examiner

METHOD FOR INCREASING THE TORQUE OF A PRE-TENSIONED SPRING THAT IS WOUND AROUND A ROTATING BODY COMPRISING A LONGITUDINAL AXIS

This application is a 35 USC 371 of PCT/EP04/52473, filed Oct. 7, 2004

BACKGROUND OF THE INVENTION

The invention relates to a method for increasing the torque of a pretensioned spring which is arranged around a rotary body having a longitudinal axis and to a use of the method. Methods for the increase of torques of pretensioned springs are known. In this context, for example, there is provision for arranging the pretensioned spring around a rotatable shaft. Both ends of the pretensioned spring are in this case fixed to stops which belong to the rotatable shaft. It is often desirable, in these circumstances, for the pretensioned spring mounted in this way to be rotated over a first angular travel without the action of force. After a maximum of one full revolution of the rotatable shaft, one end of the spring is brought onto a stop which, as a rule, is to be assigned to a housing part. When the rotational movement is subsequently continued, an increase in the torque occurs due to the action of a force which is higher than the pretensioning force of the spring. This method has the disadvantage, however, that the pretensioned spring can execute only at most one full revolution without the additional action of force, before an increase in the torque then occurs. In the art, however, it is often desirable for the pretensioned spring to complete a plurality of full revolutions before an increase in the torque occurs. It is not possible, however, to fulfill these desires by means of the known devices.

SUMMARY OF THE INVENTION

The object on which the invention is based is, therefore, to provide a method for increasing the torque of a pretensioned spring which is arranged around a rotary body having a longitudinal axis, in which it is possible to initiate the increase in the torque only after a plurality of revolutions of the pretensioned spring without the additional action of force. The object of the invention is, furthermore, to provide a use of the method for increasing the torque.

The object on which the invention is based is achieved by means of a method for increasing the torque of a pretensioned spring which is arranged around a rotary body having a longitudinal axis and of which the first end and the second end are positioned, in the pretensioning state, respectively at a first stop and at a second stop which are connected to the rotary body, in which method the rotary body first executes at least X revolutions about a longitudinal axis without the external action of force, the first end engaging once during each revolution into a cam wheel which has at least X+1 teeth and at least one cam arranged parallel to the teeth, and said cam wheel rotating further by the amount of one tooth per revolution of the rotary body, in which method the rotary body is subjected continuously to the rotational movement in the pretensioning state after at least X revolutions, simultaneously the cam wheel bearing with its cam against a third stop and the first end engaging into the cam wheel, and in which method, finally, the rotational movement is continued, the first end remaining in engagement with the cam wheel and its positioning at the first stop being canceled. The torque present in the initial state is the torque which is set by the pretensioning of the spring. The first end of the pretensioned spring is positioned in the first stop. The second end of the spring is positioned in the second stop. Both the first stop and the second stop are connected to the rotary body. This may be a direct connection. However, it is also possible to connect the first stop or the second stop to the rotary body via at least one connection part. The rotary body first executes at least X revolutions about its longitudinal axis, which forms the axis of rotation, without the external action of force. Without the action of force means, here, without the action of forces both on the first end and on the second end of the pretensioned spring. The term "at least X revolutions" is to be understood as meaning that the number of revolutions does not have to be a whole number, but must be greater than 1. This is dependent on the initial position of the first end of the pretensioned spring with respect to the position of the arrangement of the cam wheel. The cam is arranged parallel to the teeth. This does not mean that the cam necessarily has to be arranged directly adjacently to a tooth of the cam wheel. Thus, for example, it may also be possible to arrange the cam in a plane parallel to the plane of the teeth between two adjacent teeth. As a rule, it is sufficient to arrange a single cam, insofar as it is possible, according to gear technology, to provide the cam wheel with X+1 teeth, insofar as X revolutions are first to be completed without the external action of force on the pretensioned spring before an increase in the torque as a result of the tensioning of the pretensioned spring, which may be designed as a torsion spring, takes place. For gear-related reasons, however, it may be necessary to select the correspondingly larger number of teeth, the result of this then being that, if appropriate, a plurality of cams must be arranged in order to implement an increase in the torque after the execution of the X revolutions without the action of force on the pretensioned spring. In such an instance, as a rule, two cams are sufficient. It was shown, surprisingly, that, according to the method, an increase in the torque of the pretensioned spring can take place relatively easily, and a plurality of revolutions can first be executed, with the pretensioning force of the pretensioned spring being maintained. The increase in the torque can thus be initiated only after a revolution of 360°, in practice even after a plurality of revolutions, without the additional action of force on the already pretensioned spring, this being desirable in many technical sectors. The additional outlay in structural terms required for this purpose is extremely low.

In a preferred embodiment of the invention, the pretensioned spring is arranged around a shaft arranged as a rotary body. This makes it easier to arrange the pretensioning spring around the rotary body and avoids damage to the pretensioned spring which could arise, for example, due to a square material used as a rotary body.

According to a further preferred embodiment of the invention, the engagement of the first end of the spring takes place into a selflocking cam wheel. The selflocking cam wheel used is, for example, a cam wheel which is selflocking due to frictional forces. This is to be understood as meaning that the cam wheel is not independently set in a rotational movement without the external action of force or does not independently rotate further after the action of the external force.

According to a further embodiment of the invention, there is provision for the cam wheel to be held releasably in its position, after each part revolution by the amount of one tooth, by a ball engaging between two adjacent teeth. The ball, as a rule, is pressed against the cam wheel by means of a spring force. As soon as the cam wheel rotates further by the amount of one tooth, the ball, for example due to a spring force acting on it, latches into the adjacent space between two adjacent teeth of the cam wheel. An independent further rotation of the cam wheel beyond a single tooth is thereby advantageously avoided in a particularly advantageous way.

In a further embodiment of the invention, the cam is brought to bear against a third stop which is part of the housing of a structural unit which consists of the rotatably mounted cam wheel, the ball, a stop and a compression spring arranged between the ball and the stop. The arrangement of such a subassembly makes it easier to carry out the method, especially since the ball can be positioned directly on the cam wheel in a relatively simple way.

According to a further preferred embodiment of the invention, the second end of the spring is positioned in a bore in the rotary body, said bore being arranged as the second stop. Construction space is advantageously saved in this way.

According to a further preferred embodiment of the invention, there is provision for the engagement of the first end into the cam wheel to take place by means of a sleeve arranged at the second end. The sleeve is manufactured, for example, from a relatively soft plastic. The engagement of the first end into the cam wheel is thereby simplified, so that jamming can be virtually ruled out and, at the same time, wear is reduced.

Finally, the subject of the invention is the use of the method in an actuating drive for setting a valve stroke of a motor vehicle. It is precisely the setting of the valve stroke which should in this case take place in a relatively simple way, and this can easily be implemented by means of the method according to the invention.

BRIEF DESCRIPTION OF THE SEVERAL VIEWS OF THE DRAWINGS

The invention is explained in more detail below, by way of example, with reference to the drawing (FIG. 1 to FIG. 8).

DETAILED DESCRIPTION OF THE INVENTION

Figure 1:
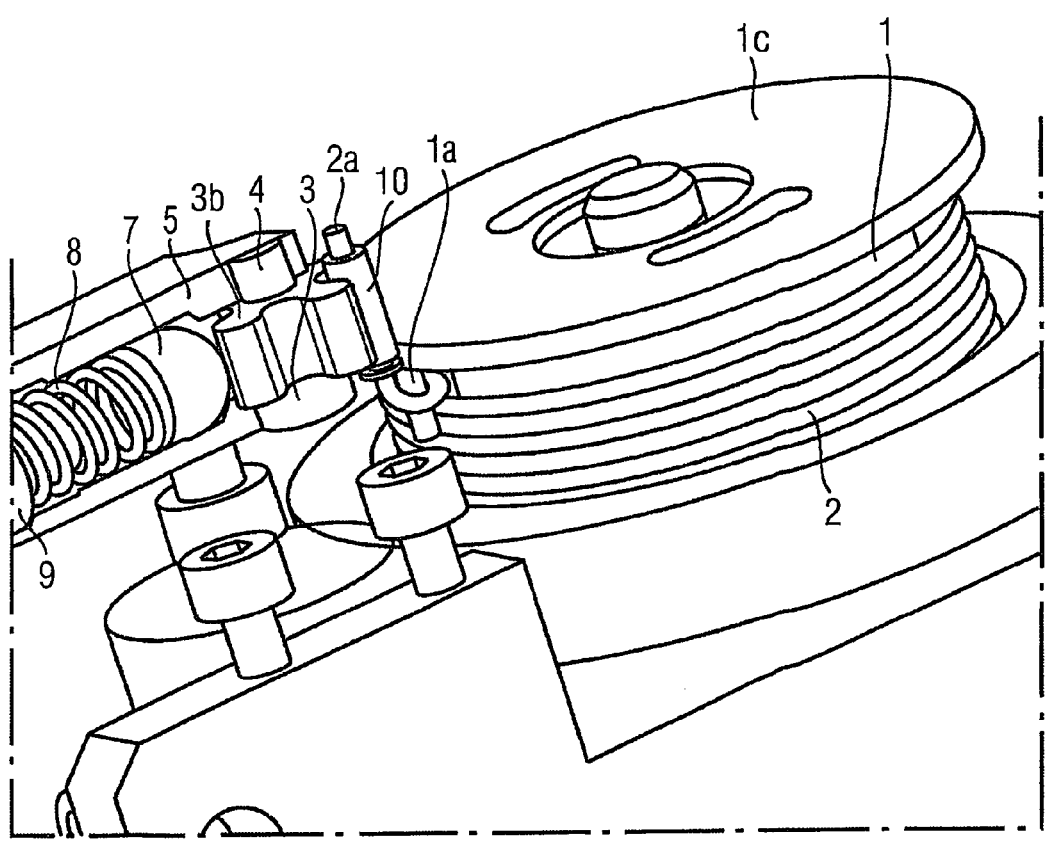
FIG. 1 shows the rotary body with the pretensioned spring and with the cam wheel in a three-dimensional form.

FIG. 1 illustrates three-dimensionally the rotary body 1, designed as a shaft, and the pretensioned spring 2. The first end 2a of the pretensioned spring 2 engages with its first end 2a and with the arranged sleeve 10 into a cam wheel 3 which has at least X+1 teeth 3b. The cam wheel 3 is rotated further by the amount of one tooth 3b per revolution of the rotary body 1. In the pretensioning state, the first end 2a is positioned at a stop 1a. The cam wheel 3 is mounted rotatably in a housing 5 via an axle 4.

The housing 5 belongs to a structural unit which consists of the rotatably mounted cam wheel 3, of a ball 7, of a stop 9 and of a compression spring 8 arranged between the ball 7 and the stop 9. The ball 7 is in this case such that it can engage into the space between two adjacent teeth 3b. The cam wheel 3 can thereby be positioned releasably, thus ensuring that the cam wheel 3 rotates no further than by the amount of a single tooth 3b per revolution of the rotary body 1. The first stop 1a is connected via a connection part 1c to the shaft arranged as a rotary body 1. It is also possible, however, to arrange the first stop 1a directly on the rotary body 1.

Figure 2:
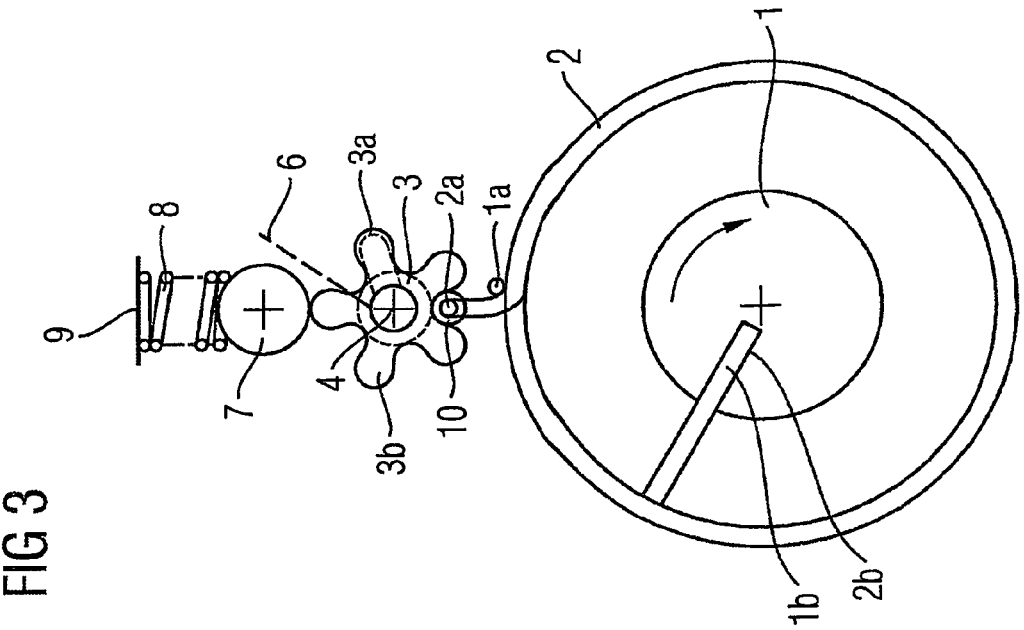
FIG. 2 shows a top view of the rotary body and the cam wheel and also the pretensioned spring after three revolutions in the pretensioned state.

FIG. 2 illustrates a top view of the rotary body 1 and the cam wheel 3 for the situation where 3 revolutions have already taken place in the pretensioning state of the pretensioned spring 2. FIG. 2 to FIG. 6 show, by way of example, the situation for X=4. Consequently, the cam wheel 3 has five teeth 3b, and there is initially provision for causing the rotary body 1 to execute four revolutions about its longitudinal axis without the external action of force, before an increase in the torque is initiated. As soon as, for example, only two full revolutions and one part revolution of 270° have been executed, a positioning, as illustrated in FIG. 2, is obtained, insofar as the rotational movement was initiated when the first end (2a) was in engagement between two teeth (3b) of the cam wheel (3). The shaft 1 rotates clockwise in the direction of the arrow. No additional forces in this case act from outside on the pretensioned spring 2. The first end 2a of the pretensioned spring 2 bears against the first stop 1a which is connected (not illustrated) to the rotary body 1. The first end 2a has an arranged sleeve 10 which is intended to make engagement into the cam wheel 3 easier. The cam wheel 3 is mounted rotatably via the axle 4 and has a cam 3a which is arranged directly adjacently to a tooth 3b and parallel to the plane of the teeth 3b. As a rule, the cam wheel 3 and the cam 3a are advantageously manufactured as an individual part. The second end 2b of the pretensioned spring 2 is positioned in a bore in the rotary body 1, said bore being arranged as the second stop 1b. A ball 7 engages into the space between two adjacent teeth 3b of the cam wheel 3 and is pressed against the cam wheel 3 by the compression spring 8 which bears on its side facing away from the ball 7 against a stop 9. As a result of the further clockwise rotation of the shaft arranged as the rotary body 1, the cam 3a moves toward a third stop 6 which is either arranged in a housing (not illustrated) or is part of a subassembly (not illustrated) in which the ball 7 is also mounted.

Figure 3:
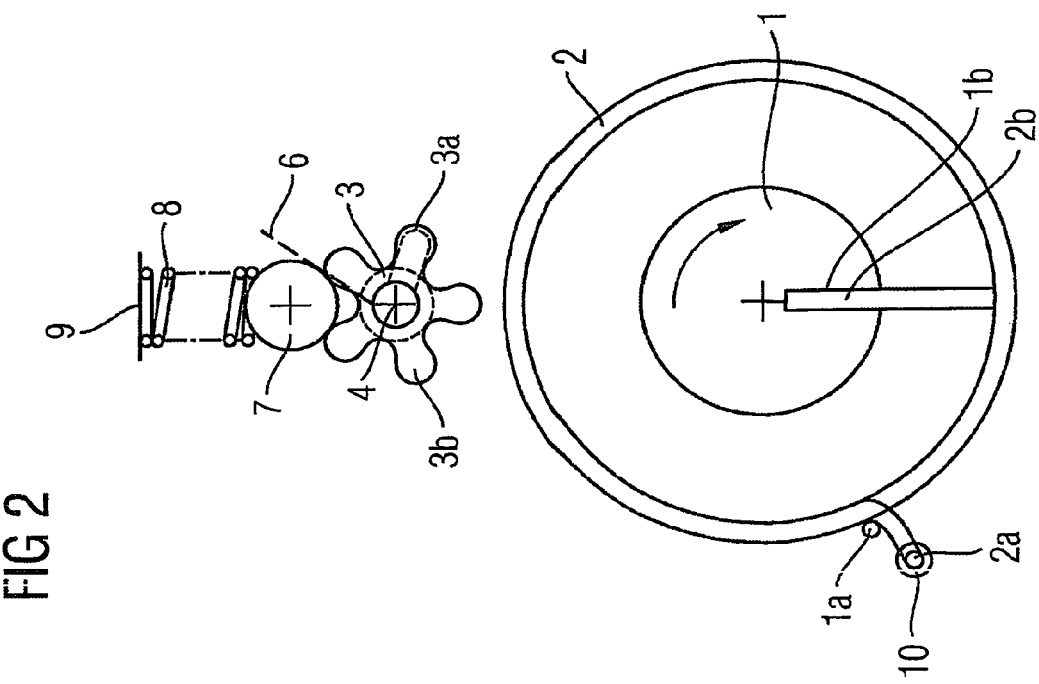
FIG. 3 shows a top view of the rotary body and the cam wheel in the state where the fourth revolution is just to be initiated, in the pretensioning state of the pretensioned spring.

FIG. 3 shows a top view of the rotary body 1 with the cam wheel 3. Starting from the position illustrated in FIG. 2, a further clockwise rotation of the rotary body 1 takes place, which has led directly to an engagement of the first end 2a into the cam wheel 3. This engagement at the same time ensures that the ball 7 is moved in the direction of the stop 9 counter to the force of the compression spring 8.

Figure 4:
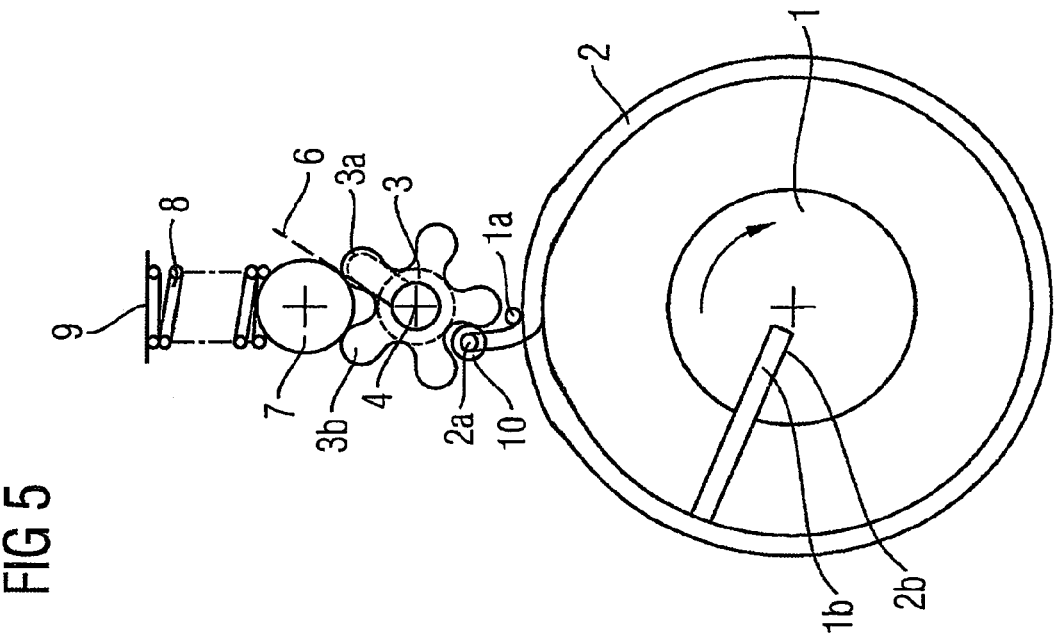
FIG. 4 shows a top view of the rotary body and the cam wheel immediately after the initiation of the fourth revolution in the pretensioning state of the pretensioned spring.

FIG. 4 illustrates a top view of the rotary body 1 and the cam wheel 3 which results as a further revolution of the rotary body 1 out of the position illustrated in FIG. 3. The ball 7 has once again been brought into a position between two teeth 3b of the cam wheel 3 as a result of the force of the compression spring 8. The cam 3a in the meantime bears firmly against the third stop 6. Only one full revolution of the rotary body 1 in the pretensioning state of the pretensioned spring 2 is thus possible.

Figure 5:
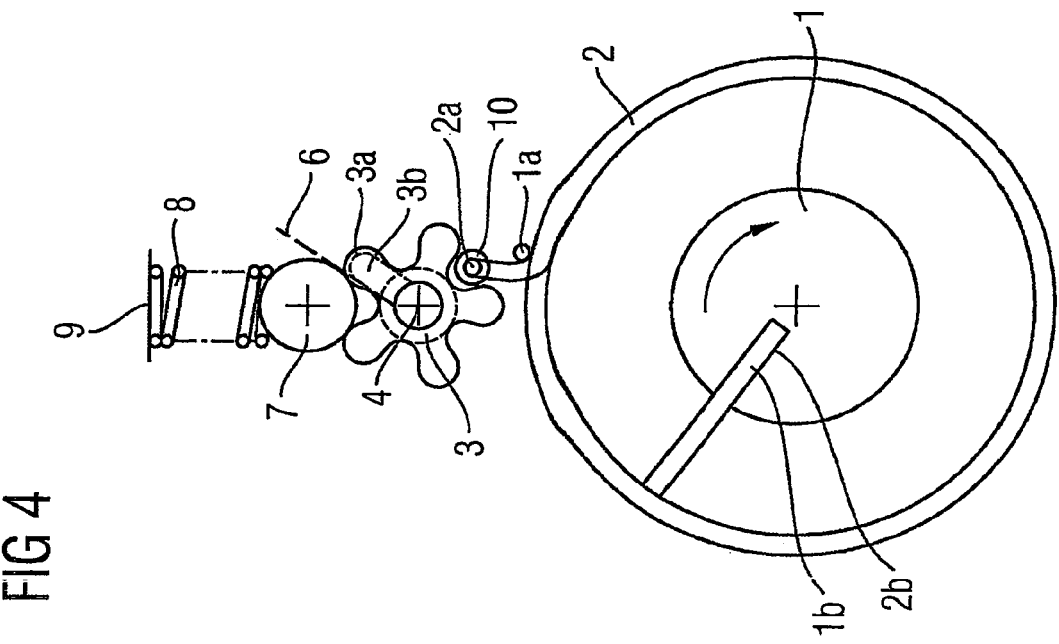
FIG. 5 shows a top view of the rotary body and the cam wheel shortly before the conclusion of the fourth revolution in the pretensioning state of the pretensioned spring.

FIG. 5 illustrates a top view of the rotary body 1 and the cam wheel 3 shortly before the execution of the last rotational movement in the pretensioning state of the pretensioned spring 2. The second end 2a, then, engages once again into the cam wheel 3 which, however, because the cam 3a bears against the third stop 6, cannot be rotated once again, counterclockwise, by the amount of one further tooth 3b. A further clockwise rotation of the rotary body 1 thus leads to the second end 2a remaining in the illustrated position in the cam wheel 3.

Figure 6:
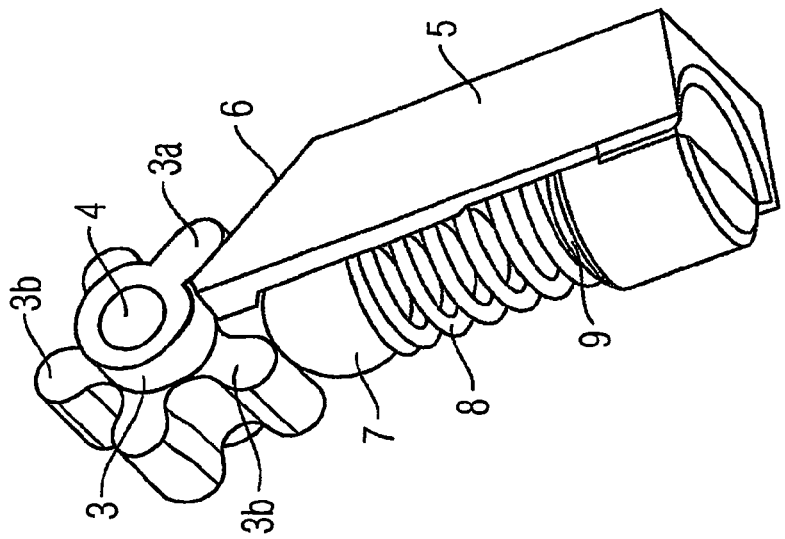
FIG. 6 shows a top view of the rotary body and the cam wheel in the state of continued rotational movement after the cancellation of the positioning of the first end at the first stop.

FIG. 6 illustrates a top view of the rotary body 1 and of the cam wheel 3, starting from the position illustrated in FIG. 5. Starting from the position illustrated in FIG. 5, the rotational movement has in the meantime been continued, the first end 2a has remained in engagement with the cam wheel 3 and its positioning at the first stop 1a has been canceled. This has been implemented in that the first stop 1a has continued to execute the rotational movement. During this movement, the torque present as a result of the pretension is increased further, the angle α illustrating the additional angle of rotation.

Figure 7:
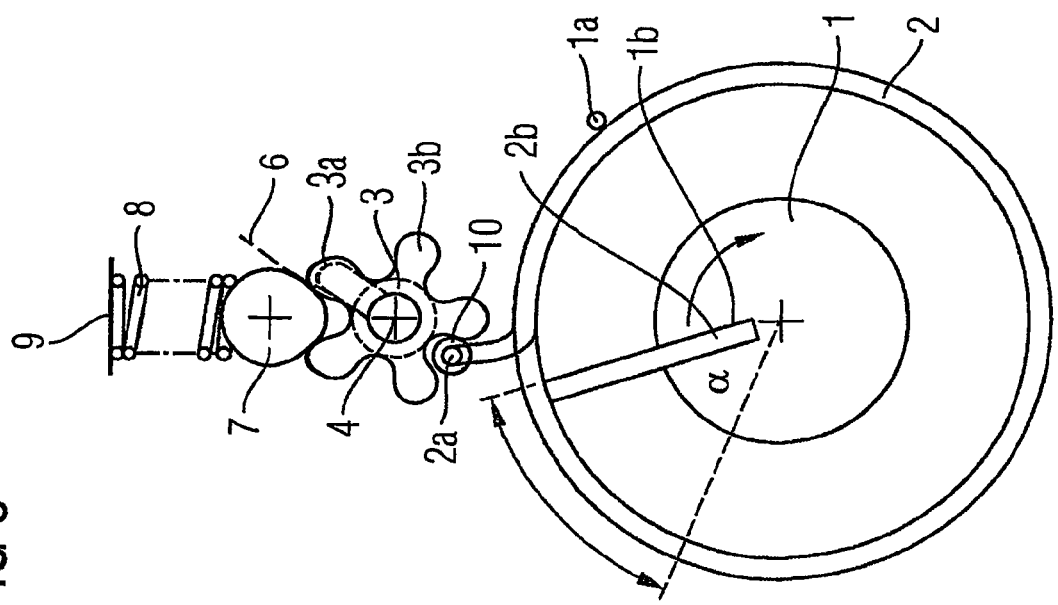
FIG. 7 shows a structural unit consisting of cam wheel, ball, stop and compression spring in three-dimensional form.

FIG. 7 illustrates a structural unit which consists of the rotatably mounted cam wheel 3, of the ball 7, of a stop 9 and of a compression spring 8 arranged between the ball 7 and the stop 9. Part of the housing 5 of the structural unit in this case forms at the same time the third stop 6 for the cam 3a of the cam wheel 3. The structural unit has a relatively compact configuration and can also be retrofitted in a particularly advantageous way.

Figure 8:
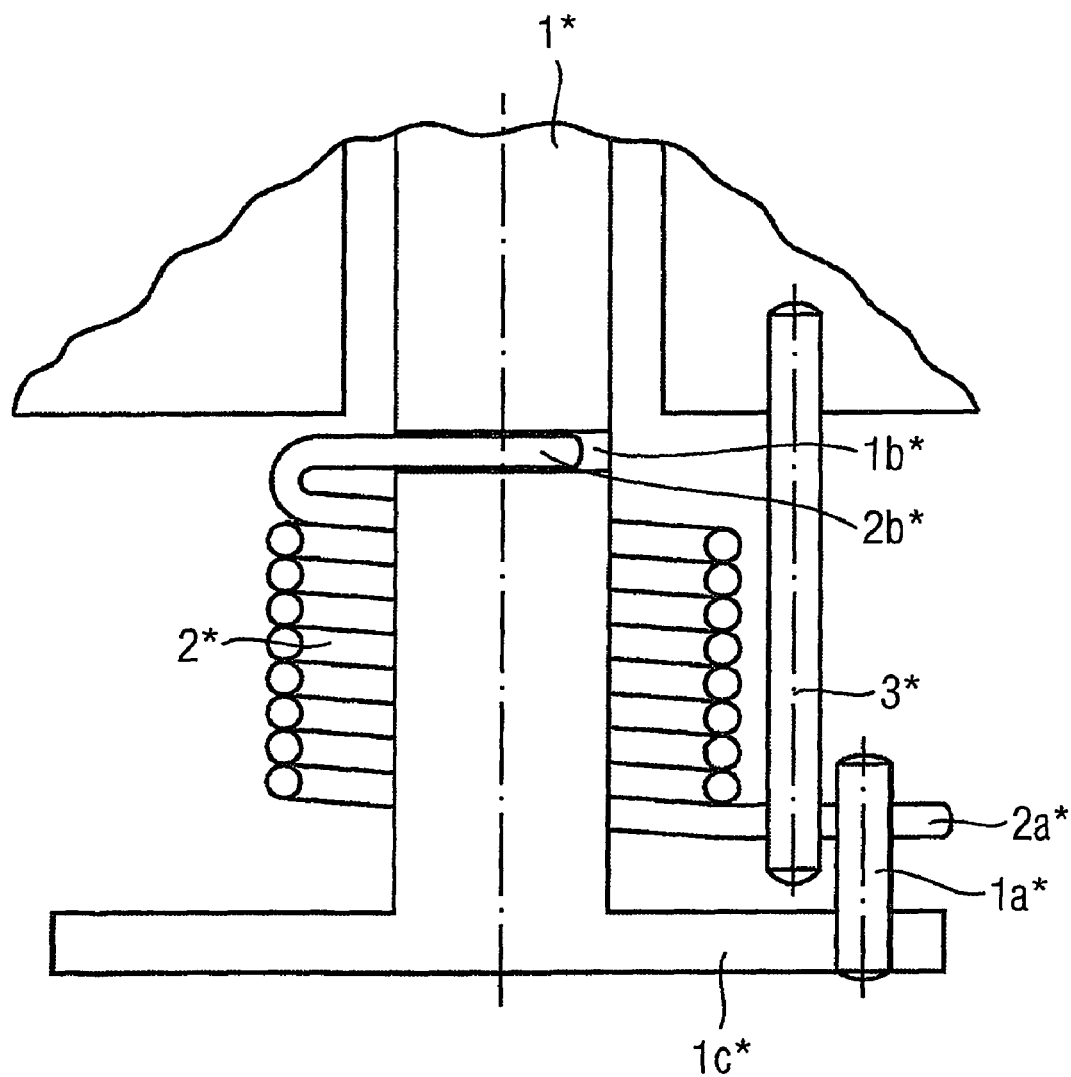
FIG. 8 shows a device for increasing the torque of a pretensioned torsion spring arranged around a rotary body having a longitudinal axis, according to the prior art, in longitudinal section.

FIG. 8 illustrates, in longitudinal section, a rotary body 1* with a pretensioned spring 2* according to the prior art. The pretensioned spring 2a* is positioned with its first end 2* and its second end 2b* respectively at a first stop 1a* and at a second stop 1b*. In the pretensioning state of the pretensioned spring 2*, the rotary body 1* can complete at most one revolution of 360°. Then, at the latest, the first end 2a* of the pretensioned spring 2* comes up against a fourth stop 3* which, for example, is connected firmly to a housing. During further rotation, an increase in the torque takes place automatically, which, in many technical situations, is desired only after further revolutions in the pretensioning state of the pretensioned spring 2*. This procedure according to the prior art is therefore extremely disadvantageous.

The invention claimed is:

1. A method for increasing the torque of a pretensioned spring which is arranged around a rotary body having a longitudinal axis, and a first end and a second end positioned, in a pretensioning state, respectively at a first stop and at a second stop which are connected to the rotary body, the method comprising the steps of:

executing at least X revolutions about a longitudinal axis without external action of force, such that the first end engages once during each revolution into a cam wheel which has at least X+1 teeth and at least one cam arranged parallel to the teeth, and said cam wheel rotates further by the amount of one tooth per revolution of the rotary body, subjecting the rotary body continuously to the rotational movement in the pretensioning state after at least X revolutions, until simultaneously the cam wheel bears with its cam against a third stop and the first end engages into the cam wheel, and continuing the rotational movement such that the first end remains in engagement with the cam wheel and its positioning at the first stop is canceled.

2. The method according to claim 1, wherein the pretensioned spring is arranged around a shaft arranged as a rotary body.

3. The method according to claim 1, wherein the engagement of the first end of the spring takes place into a selflocking cam wheel.

4. The method according to claim 3, wherein after each part revolution by the amount of one tooth, the cam wheel is held releasably in its position by a ball engaging between two adjacent teeth.

5. The method according to claim 4, further comprising the step of bring the cam to bear against a third stop which is part of the housing of a structural unit which comprises the rotatably mounted cam wheel, of the ball, of a stop and of a compression spring arranged between the ball and the stop.

6. The method as according to claim 1, further comprising the step of positioning the second end of the spring in a bore in the rotary body, the bore being arranged as the second stop.

7. The method according to claim 1, wherein the engagement of the first end into the cam wheel takes place by means of a sleeve arranged at the second end.

8. The method according to claim 1, further comprising the step of setting a valve stroke of a motor vehicle.

* * * * *